United States Patent [19]

Penhard

[11] Patent Number: 4,513,287

[45] Date of Patent: Apr. 23, 1985

[54] DEVICE FOR THE ELIMINATION OF $N^{th}$ TRACE MOVING ECHOES AND INTERFERENCE ECHOES IN A RADAR

[75] Inventor: Serge J. Penhard, Paris, France

[73] Assignee: Thomson-CSF, Paris, France

[21] Appl. No.: 411,567

[22] Filed: Aug. 25, 1982

[30] Foreign Application Priority Data

Aug. 28, 1981 [FR] France .................. 81 16466

[51] Int. Cl.³ .................. G01S 7/28; G01S 9/02
[52] U.S. Cl. .................. 343/5 CF; 343/7.7; 343/17.1 PF
[58] Field of Search .................. 343/7 A, 7.7, 17.1 R, 343/5 CE, 5 CF, 5 SM, 17.1 PF, 5, 7, 17.7

[56] References Cited

U.S. PATENT DOCUMENTS

| | | | |
|---|---|---|---|
| 3,109,171 | 10/1963 | Henry et al. | |
| 3,828,348 | 8/1974 | Murray, Jr. | |
| 3,995,270 | 11/1976 | Perry et al. | 343/5 CF X |
| 4,025,919 | 5/1977 | Jefferies et al. | 343/5 CM X |
| 4,095,222 | 6/1978 | Mooney, Jr. | 343/17.1 PF X |
| 4,168,500 | 9/1979 | Brassaw | 343/5 CM X |
| 4,213,127 | 7/1980 | Cole | 343/5 CF |
| 4,228,435 | 10/1980 | Nevin | 343/5 CM |

FOREIGN PATENT DOCUMENTS 0030750 6/1981 European Pat. Off. .......... 343/5 CF

*Primary Examiner*—Maynard R. Wilbur
*Assistant Examiner*—Brian Steinberger
*Attorney, Agent, or Firm*—Cushman, Darby & Cushman

[57] ABSTRACT

A device for the elimination of $n^{th}$ trace moving echoes and radar interference echoes in a radar system operating by bursts and comprising a display device for moving targets. The device comprises means for detecting first and $n^{th}$ trace echoes of which the amplitudes exceed, respectively, two given thresholds $S_1$ and $S_2$, and means for comparing these echoes with each other. The device finds particular utilization in a surveillance radar or in a radar landing system operating by pulses.

10 Claims, 7 Drawing Figures

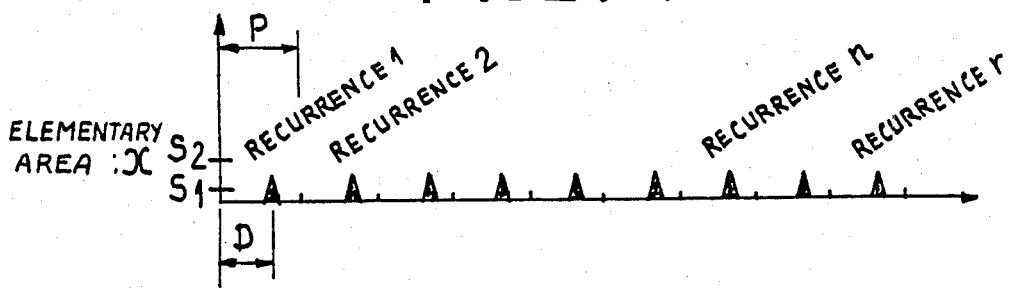
FIG_1-a
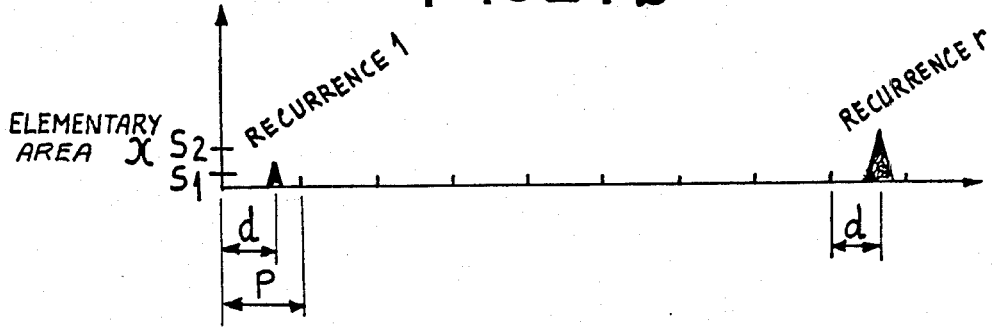
FIG_1-b
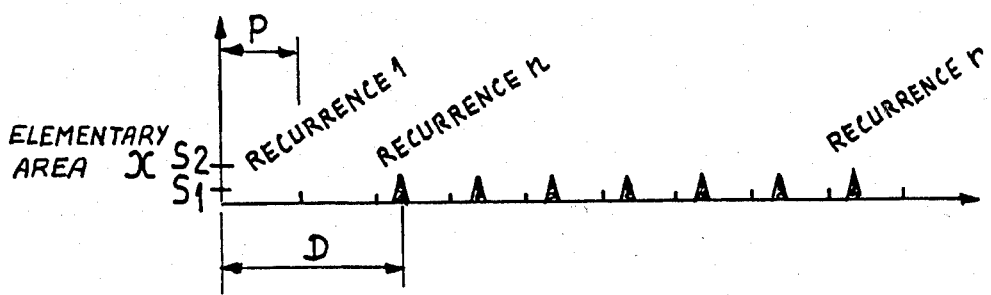
FIG_2-a
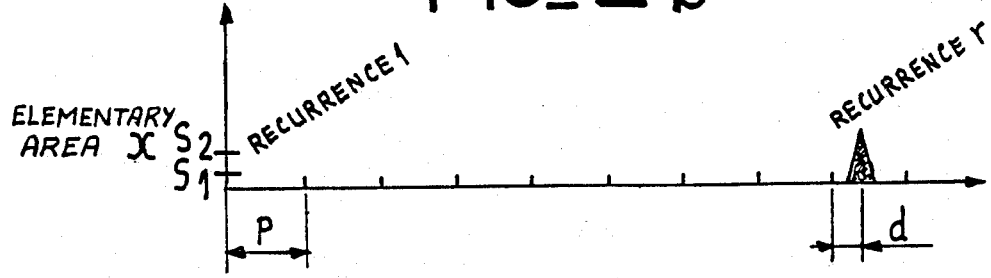
FIG_2-b

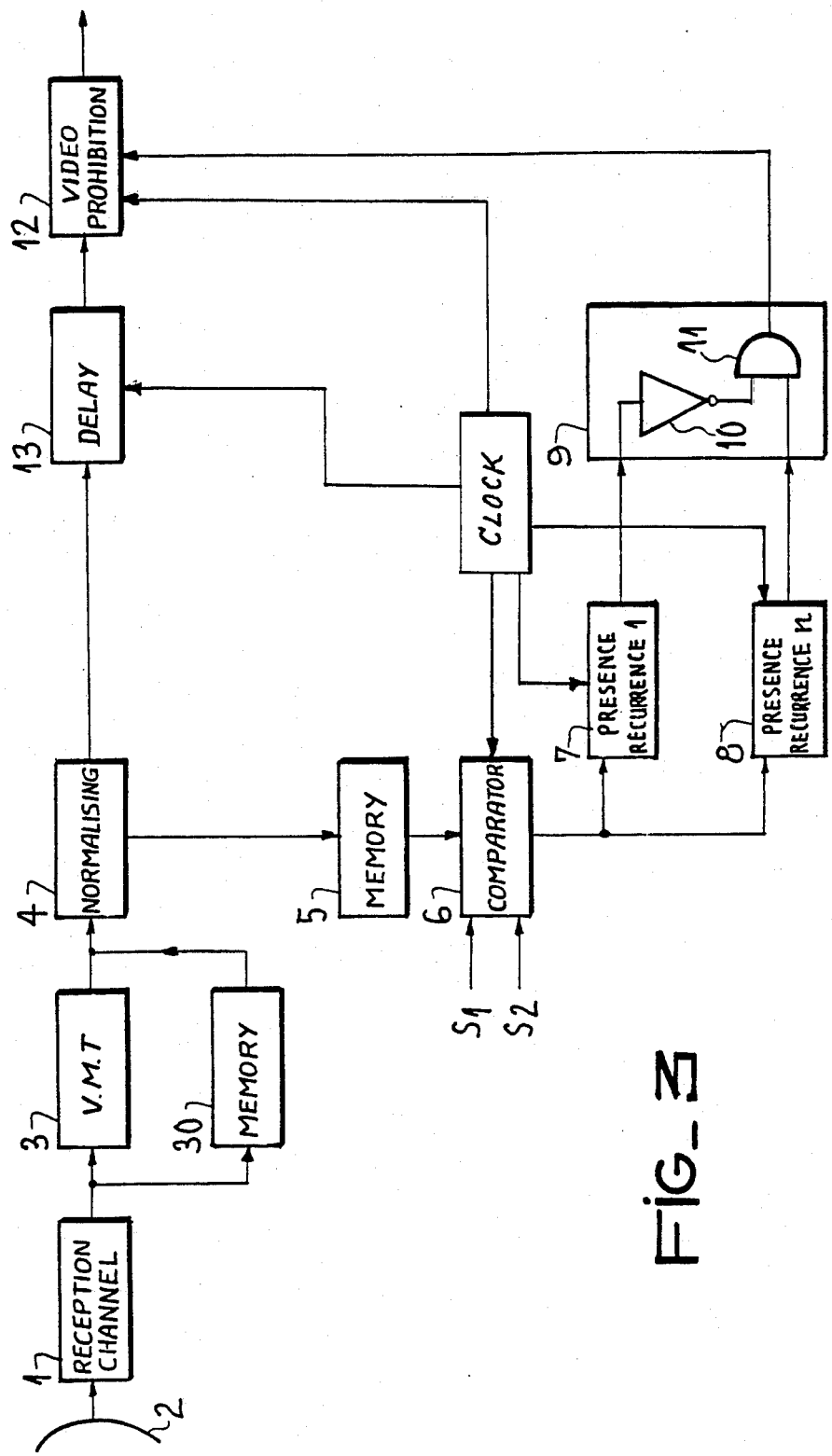
FIG_2

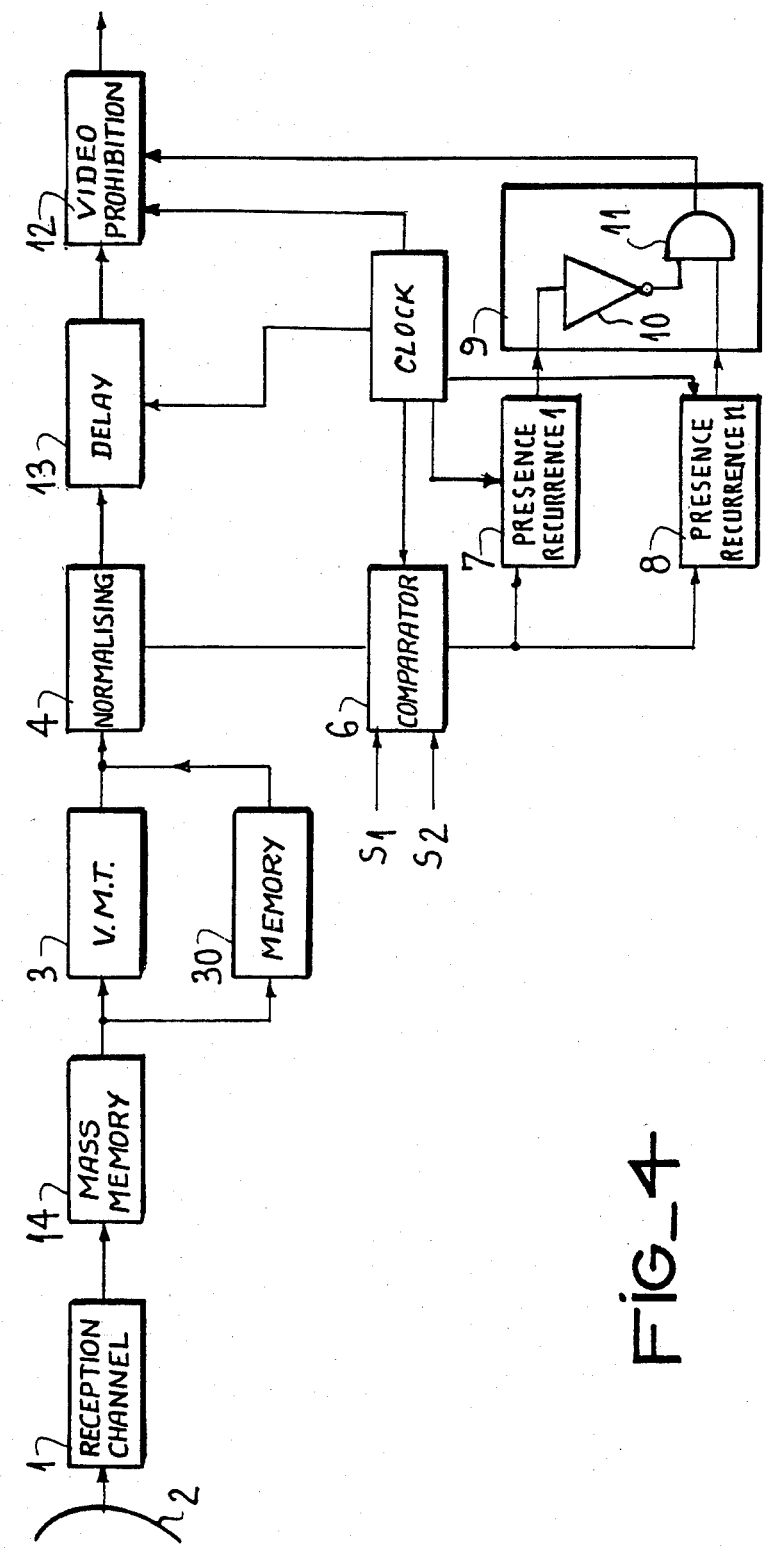
FIG_4

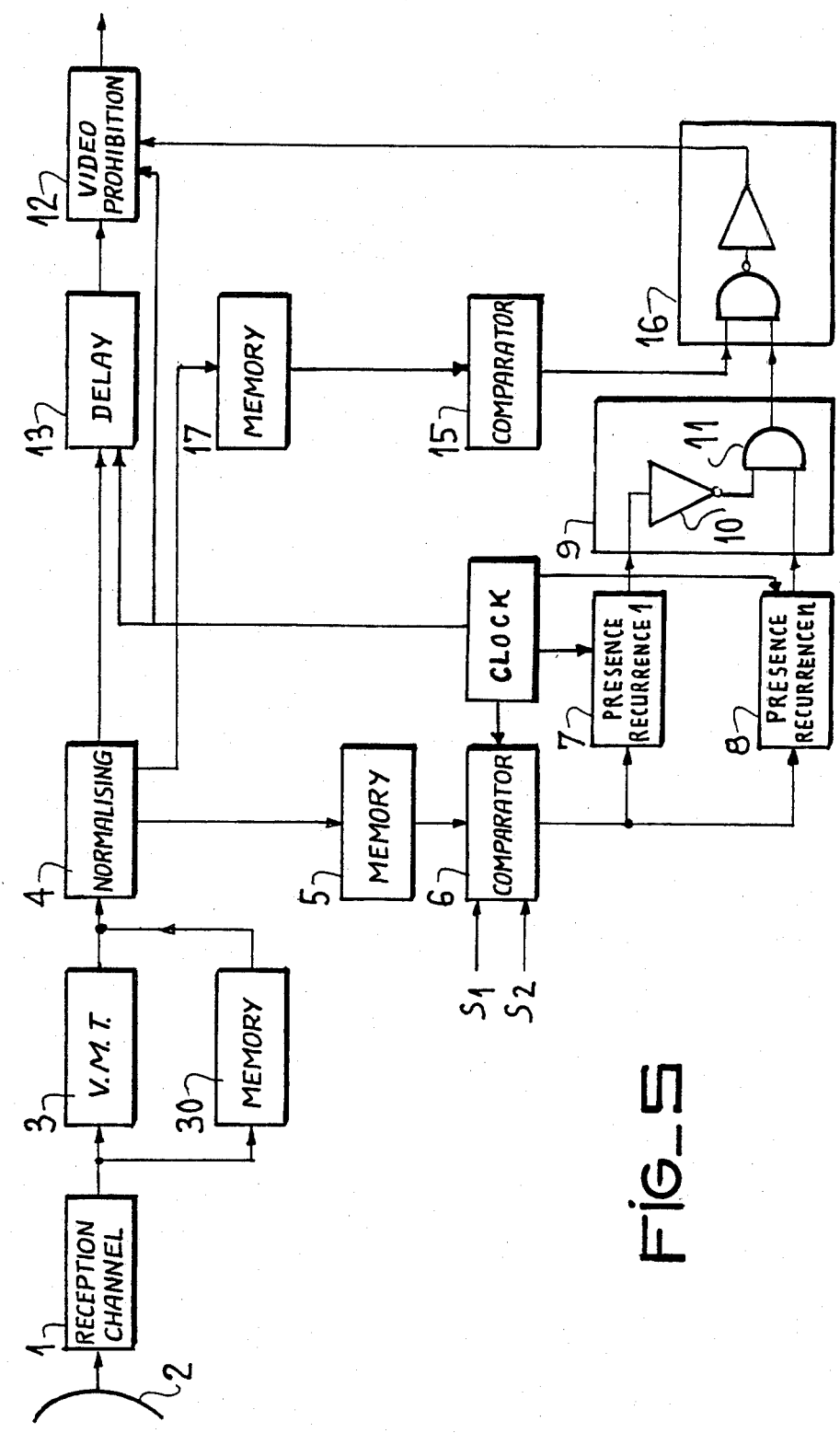
FIG_5

DEVICE FOR THE ELIMINATION OF Nth TRACE MOVING ECHOES AND INTERFERENCE ECHOES IN A RADAR

BACKGROUND OF THE INVENTION

The present invention relates to a device for the elimination of nth trace moving echoes and radar interference echoes in a radar equipment operating by bursts and provided with a device for displaying moving targets (VMT). VMT is also known as Moving Target Indication (MTI). The description "radar operating by bursts" is intended to denote a radar which transmits signals during a particular number of successive recurrences, all the recurrences belonging to one and the same burst having the same tranmission frequency and the same recurrence cycle.

Owing to the improvement of the detection and of the power of the transmitters utilised in a surveillance or landing radar, the number of useful and interference moving echoes received grows ever greater, which entails certain disadvantages. In particular for a given range P of a radar under consideration, if the distance D of a detected target from the radar is shorter than this range, the distance of the target read ion the video display is certainly the true distance, but if the target is positioned at a distance D exceeding the radar range P, the video indication is incorrect which may impair the subsequent utilisation of the radar signal. Another drawback may occur because of the originating from another radar at a nearby location and of which the recurrence frequency differs from that of the radar in question. These echoes appear only once within a burst and, within a range cell, they may interfere with the useful indications provided by the radar video display.

The invention has as an object to remedy these disadvantages and to provide a device for the elimination of these interference echoes, or at least strongly to attenuate the same, for example so as to prevent a flight controller from initiating a landing procedure based on the of these interference echoes.

SUMMARY OF THE INVENTION

To tis end and in accordance with the invention, a device for the elimination of the nth trace moving echoes and of radar interference echoes a radar system operating in bursts and comprising a device for the visible display of moving targets (VMT), is characterised in that it comprises means for detecting first trace echoes whose amplitude exceeds a given threshold $S_1$, means for detecting n[th] trace moving echoes whose amplitude exceeds a given threshold $S_2$, means for comparing these echoes with each other and means enabling the display of the echoes on a video device.

In accordance with the invention, for each burst and for one and the same range cell, the level of the echoes of the first recurrence is compared with a threshold $S_1$, and the level of the other recurrences, filtered by the moving target display device (VMT), is compared with a threshold $S_2$. When both thresholds $S_1$ and $S_2$ are exceeded at the same time, the echoes are passed on to the video display. On the contrary, if only the threshold $S_2$ is exceeded, the echoes are eliminated.

BRIEF DESCRIPTION OF THE DRAWINGS

Other advantages and features of the invention will appear from th following description and the accompanying drawings; in which:

FIGS. 1a–b and 2a–b illustrate a given range cell, during the transmission of a burst by the radar system, FIGS. 3 and 4 are two block diagrams of embodiments of the device according to the invention, FIG. 5 is a block diagram of an embodiment of a device according to the invention, with a criterion for "dense zones".

DESCRIPTION OF THE PREFERRED EMBODIMENTS

In a radar system operating in bursts, the information relating to the space swept by the radar system are received for each range cell, that is to say per quantified distance division, for each recurrence of each burst. In FIG. 1a are shown for a burst the information originating from a target and received within a given range cell x, recurrence by recurrence, in the case in which this arget is positioned at a distance D shorter than the radar range P. The echo of this target then appears in the first recurrence as well as in the other recurrences 2 to r of the burst, r being the maximum number of recurrences per burst. The VMT filter action being first applied to the echoes of all the recurrences from 1 to r, but being unblocked however for the first one, in accordance with the invention, the level of the echo of the first recurrence is compared with a threshold $S_1$ and the level of the signal resulting from the VMT filtering action, applied to the echoes of the other recurrences and intended to eliminate the fixed echoes, is compared with a threshold $S_2$. These two echoes are illustrated in FIG. 1b, the result of the VMT filtering action performed in real time appearing at the last recurrence r of the burst.

The two thresholds $S_1$ and $S_2$ are not identical, since they must make allowance for the difference in gain between the two signals with which they are respectively compared, this difference being attributable to the VMT device which performs an integrated over several recurrences.

In the case chosen in this instance, in which the target is at a distance D smaller than the radar range P, the two thresholds will be exceeded, indicating the presence of a target seen during recurrence 1 as well as during the other recurrences. Moreover, there will be authorised the signal which is to appear on the video display to supply distance d information for the target which will certainly be equal to the true distance D.

On the contrary, if the target is situated at a greater distance D than the radar range P, the echo of this target will necessarily be absent from recurrence 1, but appears during the others as from the recurrence n corresponding to D, as is apparent from FIG. 2a.

As before, the level of the signal of the recurrence 1 is compared with the threshold $S_1$, and the level of the signal resulting from the VMT filtering action on the other recurrences n to r is compared with the level $S_2$, these two signals being illustrated in FIG. 2b. In this particular case, the threshold $S_1$ is not exceeded whereas the threshold $S_2$ is, denoting the presence of a tartet at a greater distance than the range P. The signal is then inhibited from appearing on the video display, since the latter would show false distance information. Depending on the distance D of the target from the radar, the corresponding echo appears as from the 2nd, 3rd or $n^{th}$ recurrence, which is why reference is made to a 2nd, 3rd or $n^{th}$ trace echo. The object of the invention is thus to eliminate the $n^{th}$ trace echoes, other than the first.

FIG. 3 is a block diagram of one embodiment of a device according to the invention. The conventional radar system to which the device is applied operates by bursts and comprises a reception channel 1 fed from the aerial 2, followed by a device 3 for the elimination of static echoes (VMT—visualisation of moving targets) and by a memory circuit 30 connected in parallel.

This VMT device is transparent for the first recurrence but processes the signals of the other recurrences, from the second to the last, the result of this processing appearing during the last recurrence r. The signals issuing from this VMT device are then standardised with respect to noise in a normalising device 4. This device operates to block out area sidelobe clutter. In accordance with the invention, there is added to the previous circuitry a memory circuit 5, delaying the data received during the first recurrence of each burst, range cell after range cell, so that they appear at the same time as those of the final and rth recurrence at the output side of this memory 5 which is connected to a comparator circuit 6. By means of this circuit, they are compared with the two thresholds $S_1$ and $S_2$ depending on their corresponding allocation to the recurrence 1 or the recurrence r. In accordance with this same criterion, the signals thus compared are fed to two separate logic circuits 7 and 8 determining whether the thresholds $S_1$ and $S_2$ are exceeded, in other words whether an echo is present during recurrence 1 and/or recurrence r of each burst. These two circuits indicate by the bits 0 and 1 whether or not the thresholds have been exceeded.

As is apparent from the foregoing, if the example for range cell x, an echo is present during recurrence 1 and during the final recurrence of the burst, in which the result of VMT filtering appears, it is stated that a first trace echo is present and the signal is then allowed to appear on the video, knowing that it will provide a precise distance information for the target on the indicator. If there is no echo during recurrence 1 but one is present during the final recurrence after filtering, it is stated that there is an $n^{th}$ trace echo, if the target returns an echo from the $n^{th}$ recurrence of the burst. In this case, the signal is rejected and does not appear on the video screen, Finally, and this is the last case which may be envisaged, if both thresholds $S_1$ and $S_2$ are not exceeded, there is no moving echo of interest and no signal of any kind appears on the video screen. For unblocking or leaving blocked the video stage, the logic circuits 7 and 8 have provided at their output a first logic circuit 9 comprising an inverter 10 and an AND gate 11. This circuit 9 delivers information in the form of 0 to 1 bits to a second logic circuit 12 which may or may not deliver the signal blocking the video stage. This circuit 12 equally receives the information picked up by the radar system, via a time delay circuit 13, preventing these information items from reaching the display before they are processed by the device of the invention. The circuits 6,7,8,12 and 13 are connected to a clock or sequencing means to establish coincidence between all the information.

Some radar systems have a bulk memory 14 storing the contents of each burst and situated ahead of the VMT device, as shown in FIG. 4. In accordance with the invention, this eliminates the need to position a memory circuit after the normalising device, in order to delay the recurrence 1 as compared to recurrence r. Since the other circuits of the diagrams are identical to those of FIG. 3 and their reference symbols are the same.

An attenuation of the first trace echoes may appear in the presence of clutter. To remedy this condition, a threshold is added on to the mean value of the levels of the first trace echoes, worked out during normalisation of the signals with respect to the noise, so as to establish a "dense zones" criterion. When no echo is present during recurrence 1 but present during the last recurrence containing the result of VMT filtering, two possibilities may be envisaged: one possibility is that the mean value of the levels of the first trace echoes is low, that is lower than a threshold $S_3$, in which case the video stage is inhibited; the other possibility is that this mean value exceeds $S_3$ and the video stage is then unblocked. In a practical manner—as illustrated in FIG. 5—in which the circuits indentical to those of the two FIGS. 3 and 4 bear the same reference numerals—the first trace echoes coming from the normalising circuit 4, are stored in a circuit 17 which determines the mean value of the levels of these echoes. This mean value is then compared to a threshold $S_3$ in a comparator circuit 15. This circuit 15 supplies information in the form of 0 to 1 bits which are fed into a logic circuit 16 situated at the output side of the logic circuit 9. This circuit is an AND gate connected to the circuit 12 causing inhibiting of the video stage, if need be.

A description has thus been given of a device for the elimination of $n^{th}$ trace moving echoes and of radar interference echoes, which be applied advantageously to a surveillance radar system or to a landing radar system, operating by bursts.

What is claimed is:

1. In a pulse-burst radar system in which each pulse consists of a burst of recurrence 1 to n and where the return recurrence echoes may be received for each of the radar's range cells, and wherein the radar system comprises an aerial, a reception channel connected to said aerial for receiving recurrence echoes 1 to n for each range cell, moving target means connected to said reception channel for viualizing moving targets, said moving target means transparent to the first recurrence echo and processing recurrence echoes 2 to n for each range cell, and display means connected to said moving target means for displaying recurrence echoes, a device for eliminating $n^{th}$ trace moving echoes and radar interference echoes comprising:

normalizing means connected to said moving target means for normalizing the recurrence echoes with respect to noise;

first delay means connected to said normalizing means for delaying, range cell by range cell, the first recurrence echo so that it is synchronized with the $n^{th}$ recurrence echo;

first comparing means connected to said first delay means for comparing the gain of said first recurrence echo with a threshold $S_1$, and comparing the gain of said $n^{th}$ recurrence echo with a threshold $S_2$;

first determining means connected to said comparing means for determining whether thresholds $S_1$ and $S_2$ have been exceeded by said first and $n^{th}$ recurrence echoes respectively;

first indicating means connected to said determining means for generating a signal when both threshold $S_1$ and $S_2$ have been exceeded;

second delay means connected to said normalizing means for delaying recurrence echoes 1 to n; and authorizing means connected to said second delay means and to said first indicating means for authorizing said first recurrence echo to be displayed on said display means when said signal is received from said first indicating means.

2. A device according to claim 1 further including:

second determining means connected to said normalizing means for determining the mean value of first recurrence echoes in a given range cell over multiple bursts;

second comprising means connected to said second determination means for comparing said mean value with a threshold $S_3$ and generating a signal when said mean value exceeds $S_3$;

second indicating mans connected to said second comparing means and connected between said first indicating means and said authorizing means for receiving signals from said second indicating means and from said first indicating means and indicating when thresholds $S_1$ $S_2$ and $S_2$ have been exceeded; and wherein said authorizing means is connected to said second indicating means and authorizes said first recurrence echo to be displayed on said display means when said second indicating means indicates that thresholds $S_1$, $S_2$ and $S_3$ have been exceeded.

3. A device according to claim 1 wherein said first delay means includes a memory circuit.

4. A device according to claim 1 wherein said determining means includes a first logic circuit, and wherein said first indicating means includes an first inverter connected to a first AND gate, and wherein said authorizing means includes a second logic circuit.

5. A device according to claim 2 wherein said determining means includes a first logic circuit, and wherein said first indicating means includes an first inverter connected to a first AND gate, and wherein said second indicating means includes a second inverter connected to a second AND gate, and wherein said authorizing means includes a second logic circuit.

6. In a pulse-burst radar system in whcih each pulse consists of a burst of recurrences 1 to n, and where the return recurrence echoes may be received for each of the radar's range cells, and wherein the radar system comprises an aerial, a reception channel connected to said aerial for receiving recurrence echoes 1 to n, a bulk memory connected to said reception channel for storing said recurrence echoes, moving target means connected to said bulk memory for visualizing said moving targets, said moving target means transparent to the first recurrence echo and processing recurrence echoes 2 to n, display means connected to said moving target means for displaying recurrence echoes, a device for eliminating $n^{th}$ trace moving echoes and radar interference echoes comprising:

normalizing means connected to said moving target means for normalizing the recurrence with respect to noise:

first comparing means connected to said normalizing means for comparing the strength of said first recurrence echo with a threshold $S_1$, and comparing the strength of said $n^{th}$ recurrence echo with a threshold $S_2$;

first determining means connected to said comparing means for determining whether thresholds $S_1$ and $S_2$ have been exceeded by said first and $n^{th}$ recurrence echoes, respectively;

first indicating means connected to said comparing means for generating a signal when both thresholds $S_1$ and $S_2$ have been exceeded;

delay means connected to said normalizing means for delaying recurrence echoes 1 to n; and authorizing means connected to said delay means and to said first indicating means for authorizing said first recurrence echo to be displayed on said display means when said signal is received from said first indicating means.

7. A device according to claim 6 further including:

second determinating means connected to said normalizing means for determining the mean value of first recurrence echoes in a given range cell over multiple bursts;

second comparing means connected to said second determination means for comparing said mean value with a threshold $S_3$ and generating a signal where said mean value exceeds $S_3$;

second indicating means connected to said second comparing means and connected between said first indicating means and said authorizing means for receiving signals from said second indicating means and from said first indicating means and indicating when thresholds $S_1$, $S_2$ and $S_3$ have been exceeded; and wherein said authorizing means is connected to said second indicating means and authorizes said first recurrence echo to be displayed on said display means when said second indicating means indicates that thresholds $S_1$, $S_3$ have been exceeded.

8. A device according to claim 6 wherein said first delay means includes a memory circuit.

9. A device according to claim 6 wherein said determining means includes a first logic circuit, and wherein said first indicating means includes a first inverter connected to a first AND gate, and wherein said authorizing means includes a second logic circuit.

10. A device according to claim 7 wherein said determining means includes a first logic circuit, and wherein said first indicating means includes a first inverter connected to a first AND gate, and wherein said second indicating means includes a second inverter connected to a second AND gate, and wherein said authorizing means includes a second logic circuit.

* * * * *